United States Patent [19]

Dethlefs et al.

[11] Patent Number: 5,049,595
[45] Date of Patent: Sep. 17, 1991

[54] PLASTIC CONCENTRATE FOR PHOTOGRAPHIC SUPPORT MATERIAL COATINGS

[75] Inventors: Ralf-Burkhard Dethlefs; Bernd Scholz, both of Osnabruck; Wolfram Wysk, Belm, all of Fed. Rep. of Germany

[73] Assignee: Felix Schoeller jr. GmbH & Co. KG, Berg Gretesch, Fed. Rep. of Germany

[21] Appl. No.: 448,734

[22] Filed: Dec. 11, 1989

[30] Foreign Application Priority Data

Dec. 9, 1988 [DE] Fed. Rep. of Germany ....... 3841457

[51] Int. Cl.$^5$ ............................................. C08J 3/20
[52] U.S. Cl. ................................... 523/351; 524/413; 524/585; 524/586; 524/587
[58] Field of Search ............... 523/351; 524/413, 585, 524/586, 587

[56] References Cited

U.S. PATENT DOCUMENTS

| | | | |
|---|---|---|---|
| 4,734,450 | 3/1988 | Kawai et al. | 524/413 |
| 4,758,396 | 7/1988 | Crass et al. | 524/586 |
| 4,801,509 | 1/1989 | Uno et al. | 430/536 |
| 4,868,226 | 9/1989 | Mitsumo et al. | 523/351 |
| 4,891,392 | 1/1990 | Abe et al. | 523/351 |
| 4,895,688 | 1/1990 | Shigetani et al. | 430/538 |

*Primary Examiner*—Joseph L. Schofer
*Assistant Examiner*—Mark Sweet
*Attorney, Agent, or Firm*—Lockwood, Alex, FitzGibbon & Cummings

[57] ABSTRACT

A plastic concentrate containing a pigment and/or filler for the production of a polyolefin coating compound for photographic support materials produced by means of a double screw extruder with degassing.

18 Claims, 1 Drawing Sheet

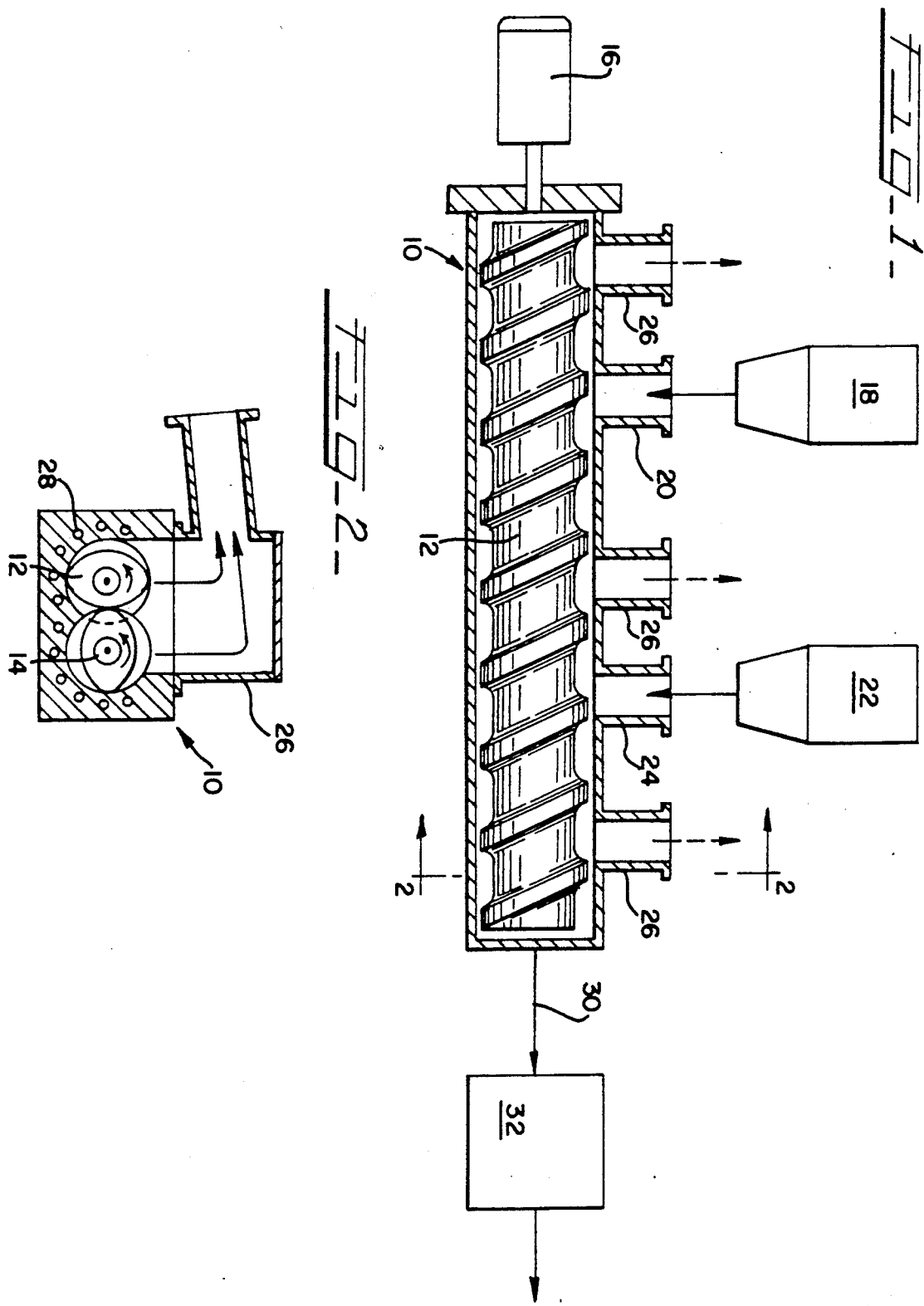

PLASTIC CONCENTRATE FOR PHOTOGRAPHIC SUPPORT MATERIAL COATINGS

BACKGROUND AND DESCRIPTION OF THE INVENTION

The present invention relates to a plastic concentrate containing pigment and/or filler, for the production of a polyolefin coating compound for photographic support materials. More particularly, the invention relates to the use of a double screw extruder with degassing for the production of photographic pigmented plastic concentrates.

Waterproof photographic support materials comprise a plastic film or base paper with a synthetic resin coating compound applied, preferably to both sides, by an extrusion process. The synthetic resin coating typically comprises a polyolefin which may contain light reflecting white pigments and, if necessary, color pigments, optical brighteners and/or other additives, such as anti-static agents, dispersing agents, anti-oxidants, release agents, etc. Polyolefins suitable for the extrusion coating of photographic base papers enriched with titanium dioxide pigment include polyethylene in its LDPE or HDPE form, ethylene-alpha-olefin-copolymerisate, so-called LLDPE, and polypropylene, as well as mixtures thereof.

The titanium dioxide can be used in its rutile and/or anatase modification and also in an inorganic and/or organic surface treated form. The inorganic surface treatment can be carried out with $Al_2O_3$, $SiO_2$, $Mg(OH)_2$ or zirconium aluminates, and the organic surface treatment can be carried out with organic polysiloxanes, silanes, multifunctional alcohols, alkyl titanates, alkanolamines, etc. In addition to titanium dioxide, other pigments or fillers may be used, such as ultramarine, cobalt blue, cobalt violet, carbon black, $Al_2O_3$, $SiO_2$ or surface-treated calcium carbonate.

It is also known that the sharpness of an image is related to the amount of titanium dioxide in the polyolefin layer of the photographic support material. A higher titanium dioxide content in the polyolefin layer provides a higher degree of sharpness of the image.

The complete disintegration of the pigment agglomerates and the homogeneous distribution of the pigment particles are the presupposition for the complete development of the pigment characteristics in the plastic, as well as for trouble-free processing. This is particularly important in the production of thin coatings (25-50μ), in which $TiO_2$ concentrations of up to 20% or more are necessary. In thin polyolefin layers, pigment agglomerates, on the one hand, reduce the light reflection and, on the other hand, lead to the formation of holes and cracks and, finally, to the tearing of the film. A good dispersion of the pigment is therefore necessary.

Thus, for the pigmenting of polyolefins, rather than pure pigments, pigment plastic concentrates have been used in which the pigment is already present in dispersed form. Such concentrates are prepared in a special work operation with the aid of kneading machines, rolling mills or mixers, whereby the increase of shearing forces causes an improvement in the dispersal of the pigment.

In accordance with the present state of the art, plastic concentrates are produced in accordance with various methods (such as for example U.S. Pat. No. 4,650,747; JP 60 75 832). All methods are characterized by the use of auxiliary dispersing agents, for example salts or esters of higher fatty acids, such a stearates, and the use of surface-treated titanium dioxides. In all the prior methods kneading machines and mixers, preferably Banbury mixers, were employed.

The plastic concentrates produced in accordance with the methods stated above are always characterized, despite the use of the auxiliary methods stated above, by a non-homogenous consistency. The pigment particles are presumably not completely covered and, as a result, optimal dispersibility is not ensured.

Polar pigments, such as for example $TiO_2$, particularly when incorporated into non-polar polymers, such as polyolefins, tend to a pronounced reagglomeration, due to the high surface energy which is imparted to them. This is particularly true with pigment concentrations of greater than 15 weight %. Thus, a limit to the concentration of the pigments may have to be set which may result in the inability to attain desired or necessary concentrations. Furthermore, due to this reagglomeration difficulties arise during the extrusion coating, such as for example excessively great sieve residue, the plugging of the extrusion dies and holes and cracks or crazes in the film.

The kneading machines and mixers used in the state of the art in the production of photographic plastic concentrate master batches as a rule operate in a non-continuous manner and without degassing. These kneading machines and mixers have been preferentially employed up until the present because the processing temperatures are in the range of 120° to 140° C. and thereby the thermal stress on the plastic is not too great. The conventional Banbury mixer, for example, comprises two spiral-shaped blades located in a mixing chamber and which rotate in opposite directions. After the mixing process has been completed (approximately 2 minutes), the chamber is emptied of the resulting master batch.

Additive materials, such as fillers or pigments normally contain moisture, air and/or surface-active agents which lead to a reduction in the quality of the master batch. The chemically bonded residual moisture on the surface of the pigment particles and the moisture in the pores lead, for example, to so-called "water braids" in the extrusion coating. Moreover, the so-called "kneading device oil" which is forced from the outside into the bearings of the kneading blades for lubrication penetrates into the plastic mixture. During the later extrusion coating, the oil evaporates, condenses on the machine parts, drops onto the paper sheet and leads to defects in the polyethylene adhesion on the base paper. All volatile components arising from plastics or plastic mixtures generally impede the faultless covering of the pigment or filling material particles and lead to porous granulate which results in the reduced quality of the surface structure of the later coating. Furthermore, auxiliary dispersing agents which exude out and precipitate on the coating surface, results in difficulties later during the further processing of the coated support material, such as for example dull spots on the surface and reduced adhesion between the support material and light-sensitive emulsions.

It is thus the task of the invention to produce a plastic concentrate containing a pigment and/or filler, by means of which it is possible to produce a faultless coating compound for photographic support materials with a uniform distribution of the pigment or the filler therein, and the coating compound should ensure trouble-free processing.

This task is solved by the use of a continuously operating double screw extruder with degassing zone for the production of plastic concentrates containing pigment and/or fillers. The extruder is preferably one with two screws operating in a synchronous and interlocking manner. Contra-rotating double screw extruders can also be used, however. The degassing can take place in one or several stages.

It has surprisingly been found that in addition to a good degassing of the plastic concentrate, which was to be expected and the elimination of the above-mentioned difficulties which were connected with the same, such as for example "water braiding" or the contamination of the sheet by the kneading device oil and additives which are exuded out, a very good dispersion of the pigment particles without formation of agglomerates will result. This good dispersion also seems to be all the more surprising, since the addition of auxiliary dispersing agents can be dispensed with.

One further surprising effect is the fact that despite fears regarding the high temperatures prevailing in the double screw extruder (250°–300° C.), a master batch with low gels formation can be produced. Indeed, the number of gels formed is nearly one half less than what would be normal in the case of photographic master batches produced by the conventional methods.

A preferred example of a double screw extruder process and system for the preparation of the plastic concentrates of the invention is shown schematically in FIG. 1 of the drawing. In FIG. 2 a cross section through the extruder is schematically shown as viewed substantially along line 2—2 of FIG. 1.

Referring to FIG. 1, the system and process of its use includes a double screw extruder 10 having a pair of synchronous interlocking screws 12 and 14 which are powered by a suitable prime mover, such as an electric motor 16. The polyolefin may be introduced to the extruder from a suitable hopper 18 through an inlet 20, and the pigment and/or filler from a hopper 22 through an inlet 24. Although separate hoppers 18 and 22 are shown in FIG. 1, it will be appreciated that the polyolefin and pigment and/or filler may be premixed and introduced to the extruder 10 simulataneously via a single hopper 18 and inlet 20. One or more degassing ports 26 are provided along the length of the extruder 10 to degas the materials as they are thoroughly mixed in and move through the extruder. The degassing ports 26 are preferably coupled to vacuum pumps (not shown) Conduits or electrical heating means 28 may be located in the jacket of the extruder to control the temperature.

The plastic concentrate with the pigments and/or fillers thoroughly and homogeneously mixed therein is discharged from the extruder 10 at 30. This discharge 30 may be passed through a conventional granulator 32 to prepare the concentrate either for storage for later use or for further mixing with additional pure polyolefin and/or other additives. Alternatively, the discharge 30 may be extrusion coated directly on the photographic base paper support.

With the present invention the plastic concentrates can have a pigment and/or filler content of 30 to 80 weight % and can be continuously produced in two types of operation. This will be illustrated in greater detail by means of the examples which follow.

EXAMPLE 1

An LD-polyethylene granulate (Escorene LD 251, by Exxon Chemicals), with a density of 0.915 g/cm$^3$ and MFI (190° C.)=8.0 g/10 min., along with titanium dioxide (Ti-pure R 101, by DuPont), was continuously fed through a double screw extruder (Type ZSK 30, Warner & Pfleiderer GmbH) with two screws operating in a synchronous and interlocking manner. The TiO$_2$ concentrations were as follows:

| Example 1 (a): | 30 weight %; |
|---|---|
| Example 1 (b): | 50 weight %; |
| Example 1 (c): | 70 weight %. |

The degassing was carried out in the center of the screw device by a vacuum pump connected to the degassing port.

The following operational parameters were observed:

| Experiment Number: | Temperature, in °C.: | | | Retention time, minutes | Pressure, mbar. |
|---|---|---|---|---|---|
| | Extruder inlet | Mixing zone | Extruder outlet | | |
| 1 (a): | 130 | 260 | 290 | 5 | |
| 1 (b): | 130 | 260 | 290 | 5 | 5-200 |
| 1 (c): | 130 | 265 | 295 | 5 | |

After completion of the mixing process, the plastic concentrate thus produced was granulated in a known manner.

EXAMPLE 2

An LLD polyethylene granulate (Dowlex 2035, by Dow Chemical), with a density of 0.919 g/cm$^3$ and MFI (190° C.)=6 g/10 minutes, together with 40 weight % titanium dioxide (Ti-pure R 101, by Du Pont), was continuously fed through a double screw extruder (Type ZSK 30) with two screws operating in a synchronous and interlocking manner. Degassing was carried out as in Example 1.

The following operating parameters were maintained:

| Temperature at the inlet of the extruder: | Approx. 130° C. |
|---|---|
| Temperature in the mixing zone: | Approx. 270° C. |
| Temperature at the outlet of the extruder: | Approx. 300° C. |
| Retention time: | 5 minutes |
| Pressure: | 5-200 mbar |

The subsequent granulation of the resulting polyethylene concentrate was carried out in a known manner.

EXAMPLE 3

A mixture of LD-polyethylene granulate (Escorene LD 251, by Exxon Chemicals), with a density of 0.915 g/cm$^3$ and MFI (190° C.)=8 g/10 min., and HD-polyethylene granulate (Stamylex 9119 SF, by DSM), with a density of 0.964 g/cm$^3$, MFI (190° C.)=11 g/10 min., together with 40 weight % titanium dioxide (Rutile 2073, by Kronos Titan GmbH) were continuously fed through a double screw extruder (Type ZSK 30) with two screws operating in a synchronous and interlocking manner. Degassing was carried out as in Example 1. The mixing process and the subsequent granulation of the resulting polyethylene concentrate were carried out with same operating parameters as in Example 2.

EXAMPLE 4

An LD-polyethylene granulate (Escorene LD 251, by Exxon Chemicals), with a density of 0.915 g/cm$^3$ and MFI (190° C.)=8 g/10 min. was continuously fed through a double screw extruder (Type ZSK 30) with two screws operating in a synchronous and interlocking manner. Titanium dioxide (Anatase 1012, by Kronos Titan GmbH), in a quantity of 40 weight % related to the total mixture, was added at another point of the extruder screw. Degassing was carried out as in Example 1.

The following operating parameters were maintained:

| | |
|---|---|
| Temperature at the inlet of the extruder: | Approx. 130° C. |
| Temperature in the mixing zone: | Approx. 260° C. |
| Temperature at the outlet of the extruder: | Approx. 290° C. |
| Retention time: | 5 minutes |
| Pressure: | 5-200 mbar |

The subsequent granulation of the resulting polyethylene concentrate was carried out in a known manner.

EXAMPLE 5

An LD-polyethylene granulate (Escorene LD 251, by Exxon Chemicals), with a density of 0.915 g/cm$^3$ and MFI (190° C.)=8 g/10 min. together with 40 weight % of cobalt violet (by Ferro), was continuously fed through a double screw extruder (Type ZSK 30) with two screws operating in a synchronous and interlocking manner. The operating parameters of the mixing process, the degassing, as well as the subsequent granulation, are as in Example 4.

Examination of the polyethylene concentrates obtained in examples 1 to 5

The polyethylene concentrates in accordance with the invention were examined and compared with a concentrate produced in the conventional manner.

The following test methods were applied:

1. Filtra test on the concentrate.

200 g of the polyethylene concentrate were passed in the laboratory extruder at a melting temperature of 300° C., through a prewoven sieve of 25 μm mesh size. Thereafter a pure polyolefin resin was extruded through the same sieve until all pigment containing material has passed the sieve. After calcining of the sieve at 800° C., the sieve residue was determined gravimetrically and recalculated to mg residue / 1 kg TiO$_2$.

2. Number of agglomerates in the coating.

The TiO$_2$/polyethylene concentrate is diluted with pure polyethylene so as to produce a mixture having 20 weight % TiO$_2$. The cobalt violet/polyethylene concentrate is diluted with pure polyethylene so as to produce a mixture having 2 weight % cobalt violet.

These mixtures are applied as a coating using a melt extruder at a melting temperature of 300° C. and 20 m/min machine speed with 25 cm sheet width.

The pigment agglomerates on 1 m$^2$ of the coated paper are counted. In transmitted light the agglomerates are visible on a light table as dark dots without the use of a magnifying glass. This number is stated as aggl./m$^2$.

3. Gels level in the coating.

The polyethylene concentrates, as already mentioned, are diluted with pure polyethylene and applied as a coating by means of melt extruder at a melting temperature of 300° C. and 20 m/min machine speed with 25 cm sheet width as in procedure 2 above.

The gels on 1 m$^2$ of the coated paper which are visible as small elevations, are counted in oblique light. This number is stated as gels/m$^2$. The gels are non-melted polyethylene particles, which are generally of high molecular weight or consist of cross-linked polymers.

Test results:

| Example Concentrate | Filtra-Test, mg residue/ 1 kg TiO$_2$ | Number of pigment agglomerates, aggl./m$^2$ | Gel level, gels/m$^2$ |
|---|---|---|---|
| 1 (a) | 22 | 4 | 7 |
| 1 (b) | 25 | 5 | 8 |
| 1 (c) | 26 | 5 | 8 |
| 2 | 22 | 4 | 7 |
| 3 | 24 | 5 | 8 |
| 4 | 31 | 6 | 10 |
| Comparison (conventionally produced TiO$_2$-concentrate) | 87 | 13 | 20 |
| 5 | — | 3 | 4 |
| Comparison (conventionally produced cobalt-violet concentrate) | — | 6 | 7 |

We claim:

1. A method of making a master batch of plastic concentrate for the production of a photographic polyolefin substrate coating, comprising feeding at least one material from the group consisting essentially of a pigment, filling material or both, and a polyolefin consisting essentially of polyethylene, ethylene copolymerizate or mixtures thereof through a double screw extruder and at a temperature of at least about 250° C. to mix said material and polyolefin, and degassing the mix in said extruder.

2. The method of claim 1, wherein said pigment is from the group consisting essentially of titanium dioxide pigment, cobalt pigment, carbon black or mixtures thereof.

3. The method of claim 2, wherein said titanium dioxide pigment is in the form consisting essentially of rutile, anatase or mixtures thereof.

4. The method of claim 2, wherein said titanium dioxide pigment comprises particles having a surface and wherein said surface is untreated.

5. The method of claim 3, wherein said titanium dioxide pigment comprises particles having a surface and wherein said surface is untreated.

6. The method of claim 2, wherein said titanium dioxide pigment comprises particles having a surface and wherein said surface is treated.

7. The method of claim 3, wherein said titanium dioxide pigment comprises particles having a surface and wherein said surface is treated.

8. The method of claim 6, wherein said surface is treated with a material from the group consisting essentially of an inorganic, an organic or both an inorganic and organic treating material.

9. The method of claim 7, wherein said surface is treated with a material from the group consisting essentially of an inorganic, an organic or both an inorganic and organic treating material.

10. The method of claim 1, wherein the polyethylene is selected from the group consisting essentially of LDPE, HDPE or mixtures thereof, and the ethylene copolymerizate is an LLDPE.

11. The method of claim 2, wherein the polyethylene is selected from the group consisting essentially of LDPE, HDPE or mixtures thereof, and the ethylene copolymerizate is an LLDPE.

12. The method of claim 8, wherein the polyethylene is selected from the group consisting essentially of LDPE, HDPE or mixtures thereof, and the ethylene copolymerizate is an LLDPE.

13. The method of claim 1, wherein the screws of said double screw extruder are operated in a synchronous and interlocking manner.

14. The method of claim 1, wherein said degassing is carried out under vacuum.

15. A plastic concentrate for the production of a photographic polyolefin substrate coating made in accordance with the method of claim 1.

16. A plastic concentrate for the production of a photographic polyolefin substrate coating made in accordance with the method of claim 2.

17. A plastic concentrate for the production of a photographic polyolefin substrate coating made in accordance with the method of claim 8.

18. A plastic concentrate for the production of a photographic polyolefin substrate coating made in accordance with the method of claim 14.

* * * * *